United States Patent
Bürger

(10) Patent No.: US 6,666,104 B2
(45) Date of Patent: Dec. 23, 2003

(54) SHIFT DEVICE FOR A GEAR CHANGE TRANSMISSION

(75) Inventor: Hans Bürger, Esslingen (DE)

(73) Assignee: Daimler-Chrysler AG, Stuttgart (DE)

( * ) Notice: Subject to any disclaimer, the term of this patent is extended or adjusted under 35 U.S.C. 154(b) by 0 days.

(21) Appl. No.: 10/113,625

(22) Filed: Mar. 27, 2002

(65) Prior Publication Data
US 2002/0112557 A1 Aug. 22, 2002

Related U.S. Application Data

(63) Continuation-in-part of application No. PCT/EP00/09379, filed on Sep. 26, 2000.

(30) Foreign Application Priority Data

Sep. 30, 1999 (DE) .......................................... 199 46 817

(51) Int. Cl.$^7$ ................................................ B60K 20/00
(52) U.S. Cl. ................................. 74/473.36; 74/473.37
(58) Field of Search ............................ 74/473.1, 473.3, 74/473.36, 473.37, 471 XY

(56) References Cited

U.S. PATENT DOCUMENTS

| | | | |
|---|---|---|---|
| 2,425,204 A | | 8/1947 | Peterson et al. |
| 3,264,892 A | | 8/1966 | Bohman et al. |
| 4,259,877 A | * | 4/1981 | Kessmar ................... 74/473.37 |
| 4,515,029 A | * | 5/1985 | Reynolds et al. ............. 74/339 |
| 4,550,627 A | * | 11/1985 | Lauer et al. ............. 74/473.25 |
| 4,567,785 A | * | 2/1986 | Reynolds et al. ........ 74/473.24 |
| 5,357,823 A | | 10/1994 | Parsons |

FOREIGN PATENT DOCUMENTS

| | | |
|---|---|---|
| DE | 1 800 163 | 4/1970 |
| DE | 39 19 251 | 12/1989 |
| DE | 198 03 608 | 11/1999 |
| WO | WO 89/12856 | 12/1989 |

* cited by examiner

Primary Examiner—David Fenstermacher
(74) Attorney, Agent, or Firm—Klaus J. Bach

(57) ABSTRACT

In a gear shift device for a manual gear change transmission with a plurality of shift rails disposed in the transmission housing and a shift lever pivotally mounted on a joint carrier supported on a shift dome above the shift rails, the shift lever has a forked downwardly extending end in which a shift finger is received and pivotably supported by the joint carrier so as to project from the shift lever downwardly into engagement grooves of the shift rails and the shift finger is snugly engaged by the lower forked lever end of the shift lever for pivoting the shift finger at a rate which is increased with respect to that of the lower shift lever end.

1 Claim, 3 Drawing Sheets

US 6,666,104 B2

SHIFT DEVICE FOR A GEAR CHANGE TRANSMISSION

This is a continuation-in-part of application No. PCT/EP00/09379 filed Sep. 26, 2000.

BACKGROUND OF THE INVENTION

The invention relates to a gear shift device for a manual gear change transmission.

Such a gear shift device is the subject of the German Patent publication 198 03 608. It is aimed at the requirements of a remote-control gear shift device.

In a direct shift device of gear change transmissions, shift rails, which are used in a generally known way for changing the gears, are arranged next to one another in the transmission housing. A shift lever with a shift finger engaging alternately shift slots of the shift rails arranged in a row next to one another is mounted in a bearing part of the manual shift lever and is positively guided by the bearing part.

In a plurality of manual transmission with a direct gear shift device, the manual shift lever is supported by a spherical bearing structure disposed in a shift dome, which is arranged on the transmission case. The manual shift lever has an extension with a shift finger, which engages alternately the shift slots. It is assumed, in this arrangement, that the shift ratio and is the selected shift ratio. That is to say, the ratio of the distance between operating knob of the shift lever and the bearing sphere center to the distance between the bearing sphere center and shift finger actuation center is identical both for the shift plane and for the selection plane.

Often, however, ergonomic requirements lead to different transfer ratios, which can be achieved only via a cardanic support structure wherein the pivot axes for the shifting movement and those for the selecting movement are arranged one above the other and rotationally displaced by 90° relative to one another.

Because the shift forces are generally quite high the shift ratio is set very high in order to make the shifting comfortable. This however requires that the bearing center point is disposed low in the shift dome. On the other hand, the shift selection gates should be disposed close to one another. This again results in a lower selection side ratio with the bearing center point disposed high in the shift dome, and therefore to an often very high shift dome, which is often undesirable.

It is the object of the present invention to provide a direct shift device with a low shift dome and with a low selection side ratio.

SUMMARY OF THE INVENTION

In a gear shift device for a manual gear change transmission with a plurality of shift rails disposed in the transmission housing and a shift lever pivotally mounted on a joint carrier supported on a shift dome above the shift rails, the shift lever has a forked downwardly extending end in which a shift finger is received and pivotably supported by the joint carrier so as to project from the shift lever downwardly into engagement grooves of the shift rails and the shift finger is snugly engaged by the lower forked lever end of the shift lever for pivoting the shift finger at a rate which is increased with respect to that of the lower shift lever end.

The invention will be described in more detail below on the basis of an exemplary embodiment illustrated diagrammatically in the accompanying drawings.

DESCRIPTION OF A PREFERRED EMBODIMENT

Figure 1:
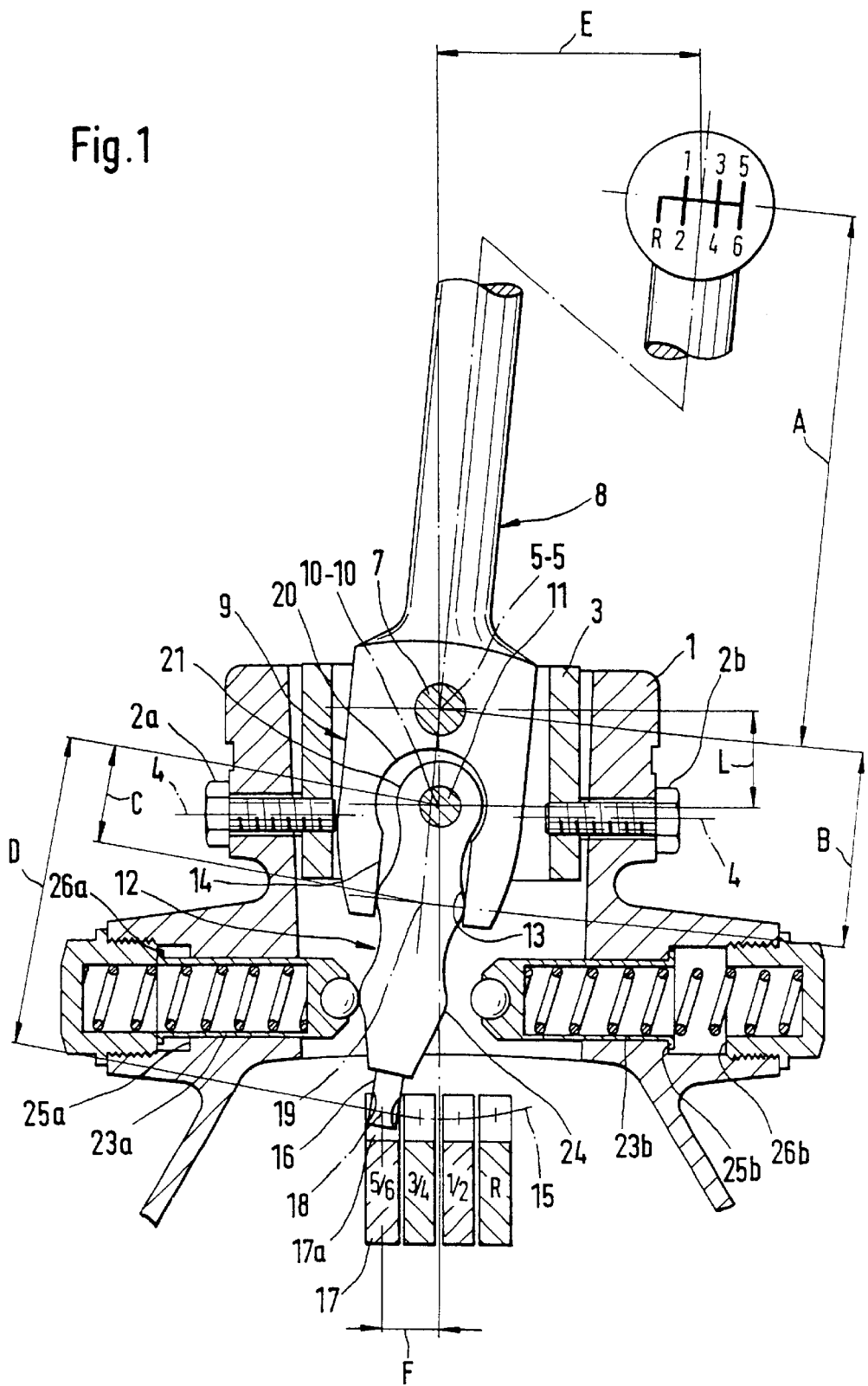
FIG. 1 shows a gear shift device according to the invention in a cross-sectional view through the gear change transmission in a plane of a transmission case, which extends perpendicularly to the transmission shafts.
Figure 2:
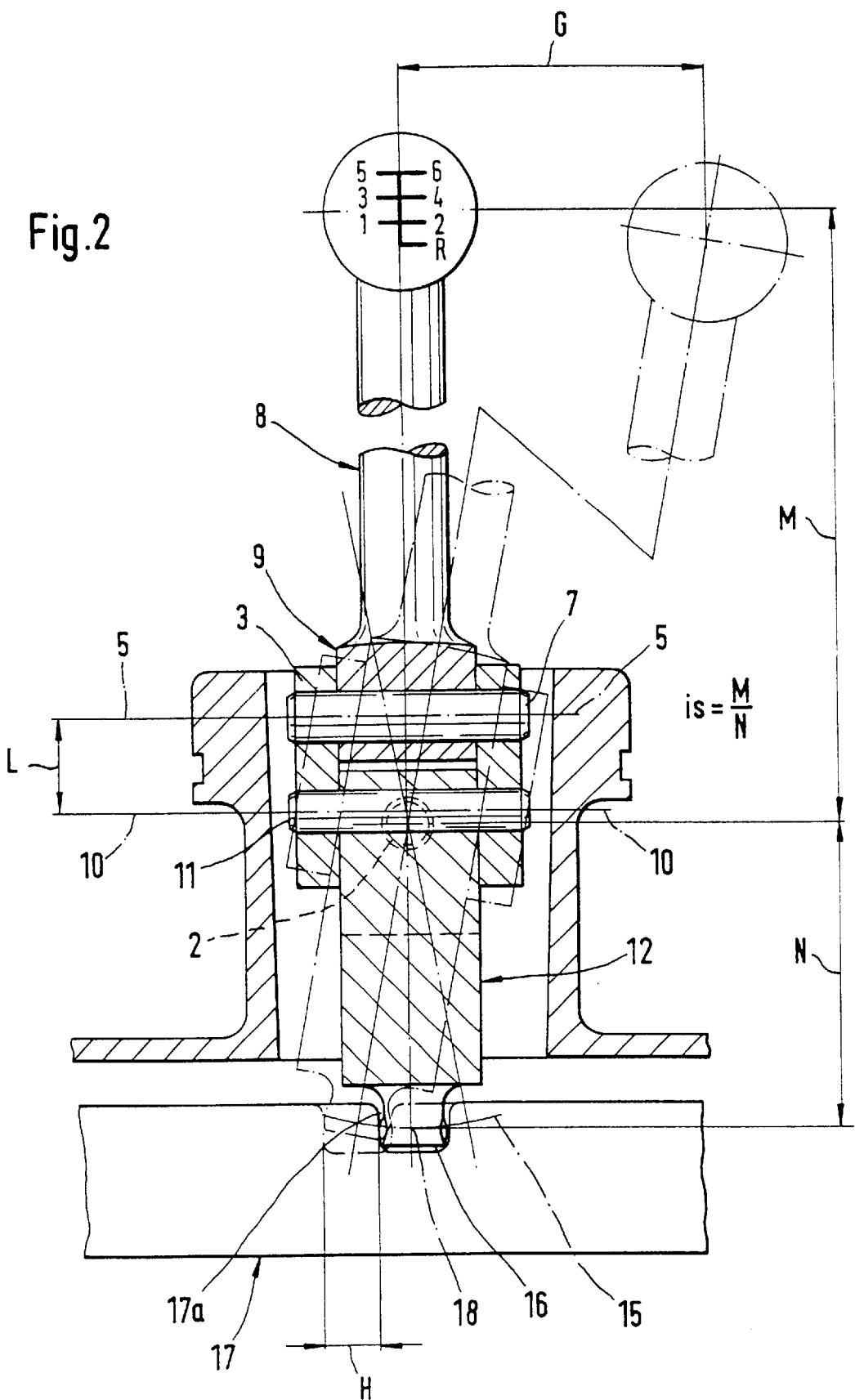
FIG. 2 shows the shift device in a longitudinal sectional plane through the gear shift device of FIG. 1.
Figure 3:
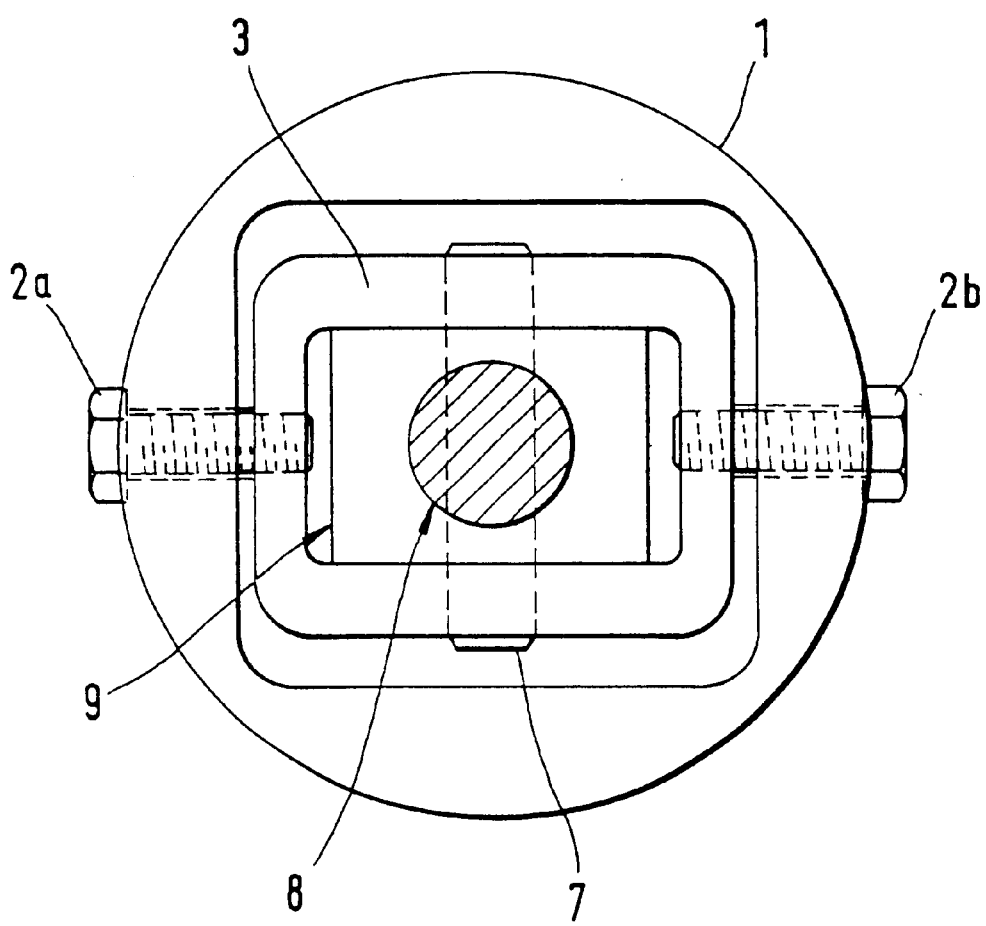
FIG. 3 shows a horizontal cross section through the gear shift device.

A cardan joint 3 is supported in a shift dome 1 of a transmission housing by means of two bearing elements 2a and 2b so as to be pivotable about a pivot axis 4—4. The vertical position of this pivot axis 4—4 is calculated from the desired shift ratio. Located above said pivot axis, and turned by 90°, is the selection axis 5—5 arranged in the cardan housing 3 and preferably consisting of a bolt 7 forming the support for the two-armed manual shift lever 8, 9, the lower lever arm 9 of which is designed as a fork-shaped claw member.

Located in the cardan housing 3 at the distance L and disposed in the same plane is a further axis 10—10, preferably comprising a bolt 11, on which a shift-finger 12 is pivotally supported.

The shift-finger 12 has, at the distance C from the axis 10—10, a cylindrical or spherical protrusion 13 by way of which the shift finger is snugly engaged by the fork 14 and is positively guided thereby.

Located at the distance D from the bolt 11 is the function radius 15 of the shift finger 16 which extends for example into the shift slot 17a of the shift rail 17.

It is clear from the representation of the kinematics apparent from FIG. 1, that the pivoting movement of the shift-finger piece 12 in the selection plane is initiated by the fork 14 of the claw member 9. The contact point center 18 of the shift finger 16 moves relative to the center 19 of the projections 13 at the ratio D/C.

The manual shift lever 8, 9 has an action radius A and the claw member 9 a finger contact distance B.

The desired selection ratio is thus divided, according to the invention, into the two ratios A/B and C/D, which are multiplied by one another. Therefore the selection ratio is $$i_w = A/B \times C/D$$

The selection ratio $i_w$ is also provided by the ratio of the distances E/F. The shift ratio amounts in a similar way to $i_s = G/H$.

The claw member 9 is provided, in the extension of the fork 14, with a clearance 20 to permit some free movement in relation to the hub 21 of the shift finger section 12.

The alignment of the shift finger extension 16 with the shift slot of the neutral shift gate (for example, $3^{rd}/4^{th}$ gear) takes place, in a generally known way, by means of two bushes 23a and 23b which, spring-assisted, are in contact with the shift-finger section 12 over a cylindrical surface 24. Stops 25a/26a and 25b/26b limit the selecting movement of the shift finger section 12 in the respective gates in the usual way.

What is claimed is:

1. A gear shift device for a manual gear change transmission having a housing with a shift dome (1), said transmission including a plurality of shift rails (17) arranged in side-by-side relationship and being longitudinally movable along shifting gears of said transmission, a joint carrier (3) supported in said shift dome (1) pivotally about a shift axis (4—4), which extends normal to a vertical transmission plane oriented in the longitudinal direction of said shift rails (17), a shift lever (8) supported on said joint carrier (3) pivotally about a horizontal operating axis (5—5) extending in said vertical transmission plane and having an upwardly extending operating arm of a length A and a downwardly extending forked actuating arm (9) forming a downwardly open holding space, a shift finger (12) supported by said joint carrier (3) pivotally about a shift finger pivot axis (10—10) extending parallel to, and in spaced relationship from, said shift lever operating axis (5—5) through said holding space of said forked actuating arm (9) and projecting downwardly out of said open holding space and having at its downwardly projecting free end a shift member (16) received in engagement grooves (17a) formed in said shift rails (17) at a distance D from said shift finger pivot axis (10—10) for longitudinally moving said shift rails (17) when said shift lever (8) is pivoted with said joint carrier (3) about said shift axis (4—4), said shift finger (12) further having side projections (24) providing for snug engagement with said forked actuating arm (9) at a distance B from said shift lever operating axis (5—5) and a distance C from said shift finger pivot axis (10—10) so as to be pivotable thereby about said shift finger pivot axis (10—10) when said shift lever (8) is pivoted about said shift lever operating axis (5—5) for pivoting said shift finger (12) about said shift finger pivot axis (10—10) at a movement increasing ratio of $i_w = A/B \times C/D$.

* * * * *